(12) United States Patent
Kuo

(10) Patent No.: US 9,970,590 B1
(45) Date of Patent: May 15, 2018

(54) DOCK WITH DETACHABLE SUPPORT ASSEMBLY

(71) Applicant: GETAC TECHNOLOGY CORPORATION, Hsinchu County (TW)

(72) Inventor: Hsiu-Yu Kuo, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days. days.

(21) Appl. No.: 15/462,736

(22) Filed: Mar. 17, 2017

(51) Int. Cl.
- *G06F 1/16* (2006.01)
- *H05K 5/00* (2006.01)
- *H05K 7/00* (2006.01)
- *F16M 11/10* (2006.01)
- *F16M 11/04* (2006.01)

(52) U.S. Cl.
CPC ........... *F16M 11/10* (2013.01); *F16M 11/041* (2013.01); *F16M 2200/024* (2013.01); *F16M 2200/08* (2013.01)

(58) Field of Classification Search
CPC .... F16M 11/10; F16M 11/041; G06F 1/1632; G06F 1/1675; G06F 1/1656; G06F 1/1633; G06F 1/1613
USPC ............... 361/679.41–679.44, 679.21–679.3, 361/679.55, 679.56
See application file for complete search history.

(56) References Cited

U.S. PATENT DOCUMENTS

| | | | | |
|---|---|---|---|---|
| 6,952,343 B2 * | 10/2005 | Sato | ...... | G06F 1/1626 361/679.57 |
| 8,749,963 B2 * | 6/2014 | Staats | ...... | G06F 1/1632 248/121 |
| 9,189,024 B2 * | 11/2015 | Knutson | ...... | G06F 1/1632 |
| 9,423,844 B2 * | 8/2016 | Strauser | ...... | G06F 1/266 |
| 9,425,651 B2 * | 8/2016 | Strauser | ...... | G06F 1/1632 |
| 9,760,116 B2 * | 9/2017 | Wylie | ...... | G06F 1/1632 |
| 2003/0222848 A1 * | 12/2003 | Solomon | ...... | G06F 1/1601 345/156 |
| 2003/0223185 A1 * | 12/2003 | Doczy | ...... | G06F 1/1626 361/679.11 |
| 2006/0171112 A1 * | 8/2006 | Lev | ...... | G06F 1/162 361/679.27 |
| 2013/0033807 A1 * | 2/2013 | Kim | ...... | G06F 1/1632 361/679.01 |
| 2013/0107126 A1 * | 5/2013 | Nonomura | ...... | H04N 5/64 348/725 |
| 2014/0355196 A1 * | 12/2014 | Hashimoto | ...... | G06F 1/1632 361/679.27 |

* cited by examiner

*Primary Examiner* — Anthony Haughton

(57) ABSTRACT

A dock with detachable support assembly includes a base and a support assembly. The base includes a first case and a first connector. The first case has a plurality of connection hole and the first connector is disposed in the first case. The support assembly is detachably assembled to the base. The use of the detachable support assembly makes the dock replace required support assembly to fit a plurality of tablets with different sizes. The user can buy the support assembly according to the size of the tablet. When the user needs to install a different size tablet, the user only needs to remove the original support assembly and sets up the necessary support assembly to the base.

10 Claims, 5 Drawing Sheets

DOCK WITH DETACHABLE SUPPORT ASSEMBLY

BACKGROUND OF THE INVENTION

Field of the Invention

The present invention relates to docks and, more particularly, to a dock with a detachable mounting assembly.

Description of the Prior Art

Although tablets are lightweight and portable, none of them can be connected to an excessive number of connectors because of the trend toward thin, lightweight tablets. As a result, a user may need to use a tablet to control various apparatuses but cannot directly connect the apparatuses to the tablet; instead, the user has to connect the tablet to a dock whereby the apparatuses can be connected to the tablet.

To meet various usage needs, tablets come in different sizes. The simplest way to enable every tablet to be connectable to an expansion dock is to manufacture a dock dedicated to tablets of each size.

SUMMARY OF THE INVENTION

The manufacturing of a dock dedicated to tablets of each size has two drawbacks: every consumer must buy plenty of docks, because s/he has to buy a dock for every newly purchased tablet of a new size; and old docks for use with old tablets which are no longer in use are useless, thereby leading to a waste of resources.

In view of this, an embodiment of the present invention provides a dock with a detachable mounting assembly. The dock comprises a base and a mounting assembly. The base comprises a first case body and a first connector. The first case body has a plurality of connection holes. The first connector is disposed at the first case body. The mounting assembly is detachably mounted on the base. The mounting assembly comprises a second case body, a second connector, a rotation adjustment module, a third case body, and a third connector. The second case body is mounted on the first case body. The second connector is disposed at the second case body and connected to the first connector. The plurality of fastening components is disposed at the second case body. The fastening components are fastened to the connection holes, respectively. The rotation adjustment module is rotatably disposed at the second case body. The third case body is disposed on the rotation adjustment module and rotates together with the rotation adjustment module. The third connector is disposed at the third case body and electrically connected to the second connector.

Therefore, the dock is applicable to tablets with different specifications by changing the mounting assembly mountable on and demountable from the base. A user purchases the mounting assembly in accordance with the specifications of an intended tablet whose specifications are different from those of all the old tablets owned by the user. To mount the intended tablet in place, all the user needs to do is to demount the old mounting assembly from the base and then mount the new mounting assembly on the base. Therefore, by mounting an expensive, sophisticated electronic component or connector on the dock, the user only needs to purchase the mounting assemblies for use with tablets with different specifications, respectively, and in consequence achieves cost-effectiveness. Furthermore, with the rotation adjustment module disposed on the mounting assembly, the angle of orientation of a tablet mounted on the mounting assembly is adjustable as needed to not only enhance the convenience of watching the tablet, but also enhance the functionality of the dock.

DETAILED DESCRIPTION OF THE EMBODIMENTS

Figure 1:
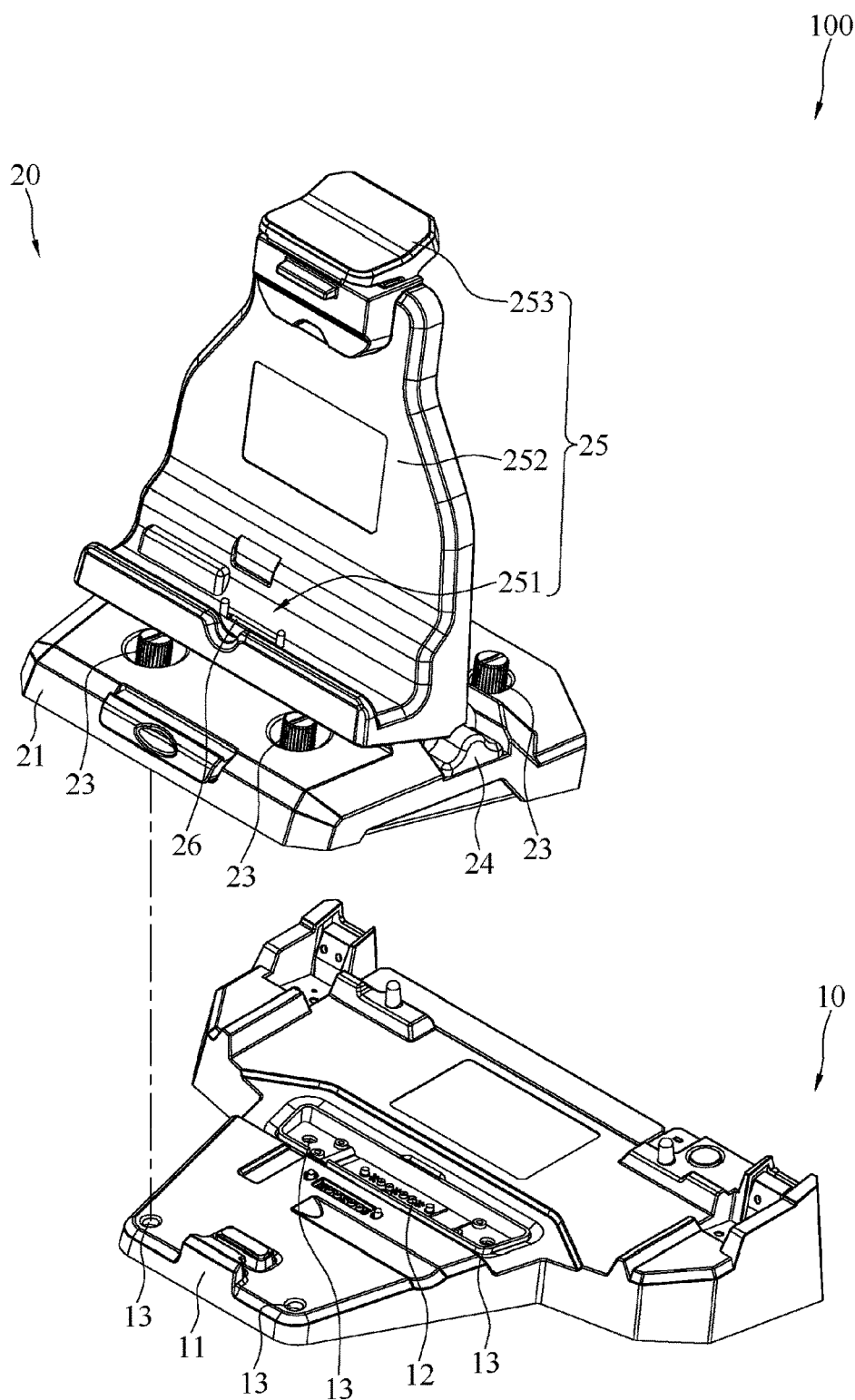
FIG. 1 is a schematic view of a dock assembled according to an embodiment of the present invention.
Figure 2:
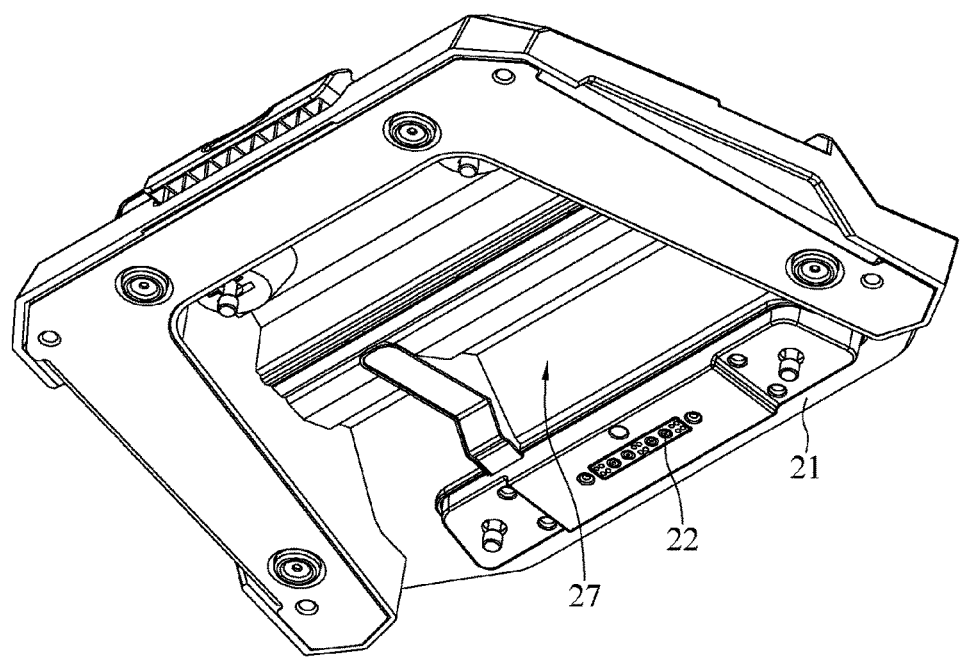
FIG. 2 is a bottom view of a mounting assembly with some components thereof omitted according to the embodiment of the present invention.

Referring to FIG. 1 and FIG. 2, FIG. 1 is a schematic view of a dock assembled according to an embodiment of the present invention, and FIG. 2 is a bottom view of a mounting assembly with some components thereof omitted according to the embodiment of the present invention. Referring to FIG. 1, in this embodiment, a dock 100 comprises a base 10 and a mounting assembly 20. The base 10 comprises a first case body 11 and a first connector 12. The first case body 11 has connection holes 13 which, in this embodiment, are in the number of four for illustrative sake, but the present invention is not limited thereto. The first connector 12 is disposed in the first case body 11.

The mounting assembly 20 comprises a second case body 21, a second connector 22, four fastening components 23, a rotation adjustment module 24, a third case body 25, and a third connector 26. The mounting assembly 20 is detachably mounted on the base 10 through the second case body 21. As shown in FIG. 2, in this embodiment, a receiving space 27 is disposed at the bottom of the second case body 21 and corresponds in shape to the front of the first case body 11 of the base 10 so that the second case body 21 can be conveniently mounted on the first case body 11 because of quick positioning and alignment. The second connector 22 is disposed at the bottom of the second case body 21 so that the second connector 22 can be connected to the first connector 12.

The four fastening components 23 are disposed at the second case body 21. When the mounting assembly 20 is mounted on the base 10, the fastening components 23 are fastened to the connection holes 13, respectively. In this embodiment, with the connection holes 13 being in the number of four, the fastening components 23 are in the number of four for illustrative sake, but the present invention is not limited thereto. In this embodiment, the fastening components 23 are screws whereby the mounting assembly 20 is detachably fastened to the base 10.

The rotation adjustment module 24 is rotatably disposed at the second case body 21. The third case body 25 is disposed on the rotation adjustment module 24 and rotates together with the rotation adjustment module 24 to adjust the angle of orientation of the third case body 25. The third connector 26 is disposed at the third case body 25 and electrically connected to the second connector 22 by a flat cable or the like. When a tablet (not shown) is mounted on the third case body 25, a connector of the tablet can be connected to the third connector 26 on the third case body 25. With the third connector 26 being electrically connected to the second connector 22 and the second connector 22 being connected to the first connector 12, the tablet can be electrically connected to the first connector 12 of the base 10 to expand the connection function of the tablet.

When the tablet is disposed at the third case body 25, its angle of orientation relative to the second case body 21 is adjustable by the rotation adjustment module 24 so that the tablet can be rotated to a position convenient to watch. The rotation adjustment structure and technique are described later.

Given the aforesaid structures, the dock 100 is applicable to tablets with different specifications by changing the mounting assembly 20 mountable on and demountable from the base 10. A user purchases the mounting assembly 20 in accordance with the specifications of an intended tablet whose specifications are different from those of all the old tablets owned by the user. To mount the intended tablet in place, all the user needs to do is to demount the old mounting assembly 20 from the base 10 and then mount the new mounting assembly 20 on the base 10. Therefore, by mounting an expensive, sophisticated electronic component or connector on the dock 100, the user only needs to purchase the mounting assemblies 20 for use with tablets with different specifications, respectively, and in consequence achieves cost-effectiveness. Furthermore, with the rotation adjustment module 24 disposed on the mounting assembly 20, the angle of orientation of a tablet mounted on the mounting assembly 20 is adjustable as needed to not only enhance the convenience of watching the tablet, but also enhance the functionality of the dock 100.

Referring to FIG. 1, the third case body 25 comprises a holding portion 251, a main body 252, and an engaging element 253. The holding portion 251 is disposed at one end of the main body 252. The third connector 26 is disposed at the holding portion 251. The engaging element 253 is disposed at the other end of the main body 252 and opposite the holding portion 251. To mount the tablet on the third case body 25, the user puts one side of the tablet in the holding portion 251 and then clamps the other side of the tablet with the engaging element 253 so that the tablet is positioned in the third case body 25. Since the tablet is mounted in place through the third case body 25, the process of manufacturing the mounting assemblies 20 is restricted to the manufacturing of the third case bodies 25 of specifications and shape which match different specifications of tablets, respectively, and other structures remain unchanged thereby cutting the manufacturing costs. Alternatively, the process of manufacturing the mounting assemblies 20 is restricted to changing the shapes of the holding portion 251 and the main body 252 to attain the required length or size. In this regard, the engaging element 253 remains unchanged, thereby dispensing with the need to manufacture new components.

Figure 3:
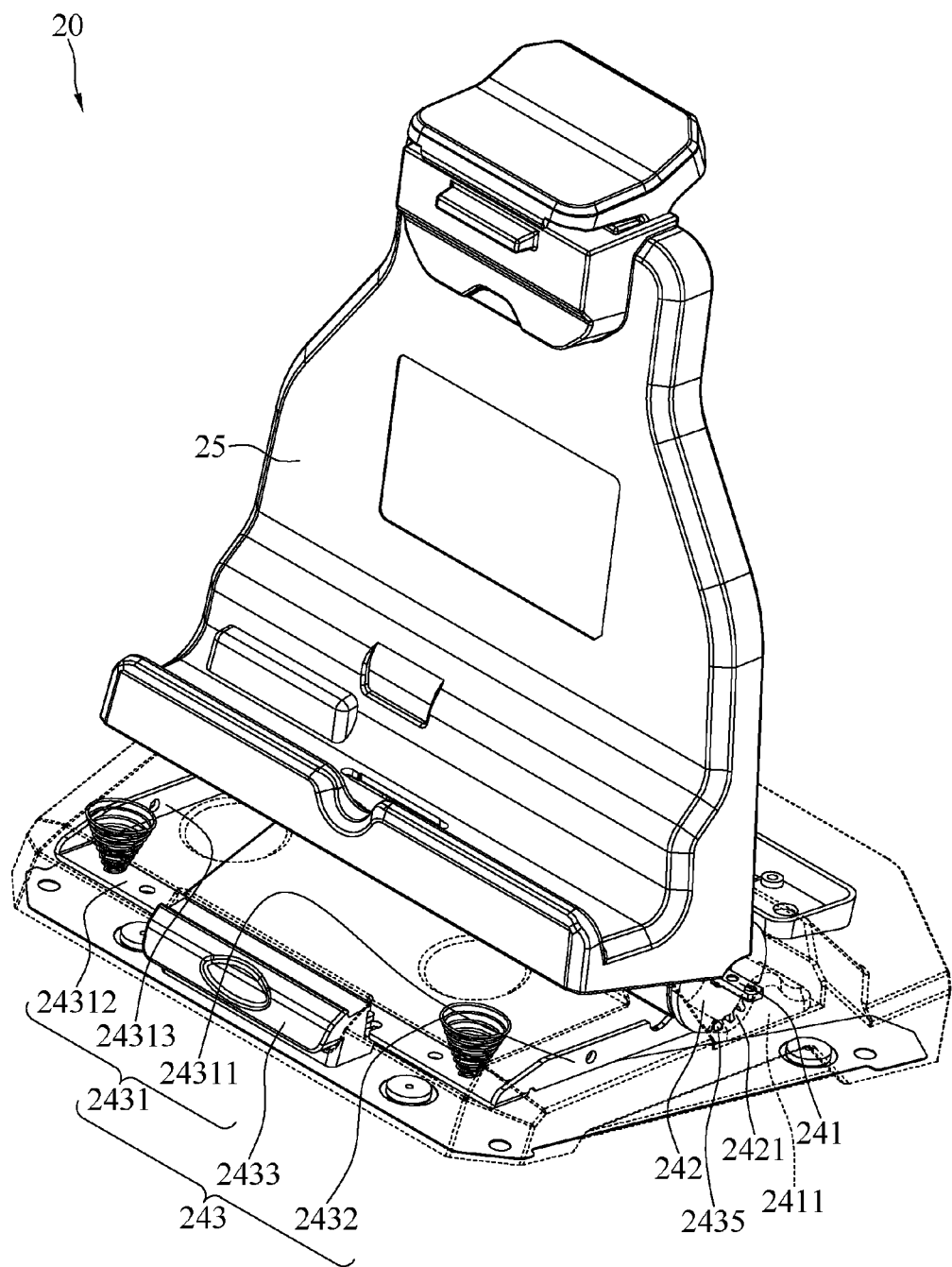
FIG. 3 is a schematic view of a rotation adjustment module at an initial position according to the embodiment of the present invention.
Figure 4:
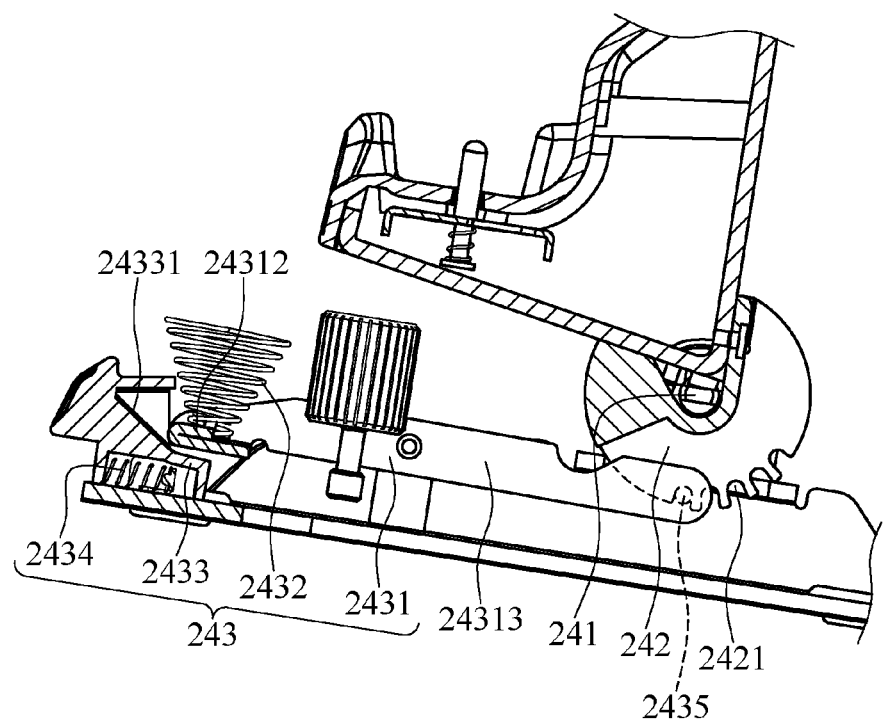
FIG. 4 is a partial cross-sectional view of the mounting assembly at the initial position according to the embodiment of the present invention.
Figure 5:
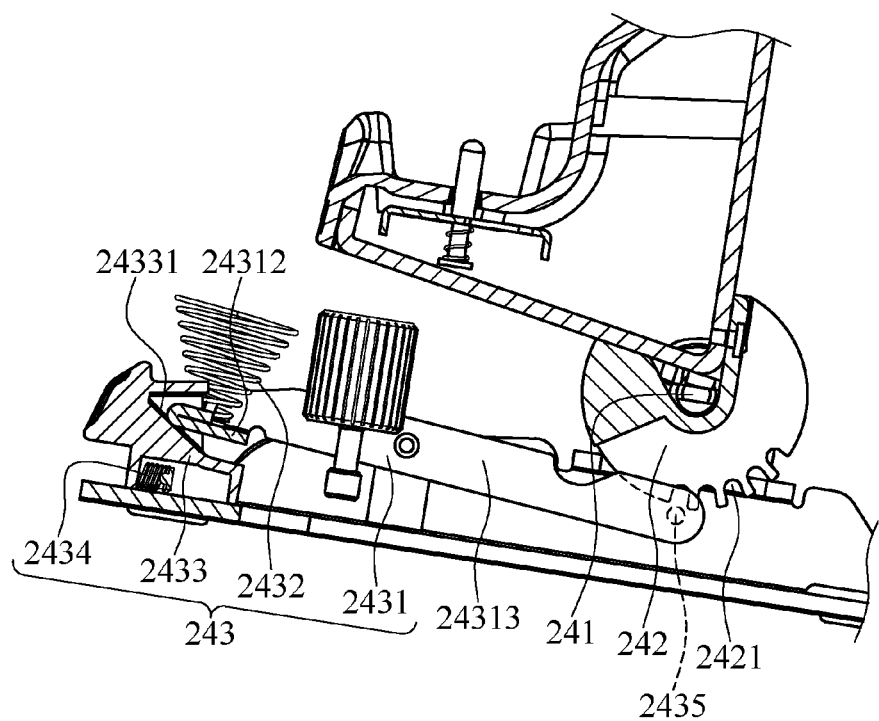
FIG. 5 is a partial cross-sectional view of the mounting assembly at a press position according to the embodiment of the present invention.

Referring to FIG. 3 through FIG. 5, the structure and operating technique of the rotation adjustment module 24 are described below. FIG. 3 is a schematic view of a rotation adjustment module at an initial position according to the embodiment of the present invention. FIG. 4 is a partial cross-sectional view of the mounting assembly at the initial position according to the embodiment of the present invention. FIG. 5 is a partial cross-sectional view of the mounting assembly at a press position according to the embodiment of the present invention. As shown in FIG. 3, part of the mounting assembly 20 is omitted to facilitate the depiction of the structure of the rotation adjustment module 24.

The rotation adjustment module 24 comprises a rotating shaft 241, a rotary disk 242, and a positioning element 243. The rotating shaft 241 is fastened to the second case body 21. In this embodiment, two rotating shafts 241 flank the third case body 25, but FIG. 3 shows only one of the two rotating shafts 241, for illustrative sake. In a variant embodiment, only one rotating shaft is disposed on one single side of the second case body 21. In another variant embodiment, one rotating shaft penetrates the second case body 21 to expose from two opposing sides thereof. However, the present invention is not limited to the variant embodiments. Since the two rotating shafts 241 are symmetric to each other, just one of them is described below. The rotating shaft 241 is fixed to the second case body 21 by a fixing element 2411. The rotating shaft 241 has one end fastened to the fixing element 2411, and the fixing element 2411 is fastened to the second case body 21.

The rotary disk 242 is fastened to the third case body 25 and penetratedly disposed at the rotating shaft 241. The rotary disk 242 is driven by the third case body 25 to rotate about the rotating shaft 241. The rotary disk 242 has a plurality of positioning grooves 2421. Since the positioning grooves 2421 enable the third case body 25 to be positioned in a manner to attain the required angle of orientation, the quantity of the positioning grooves 2421 and the distance between the positioning grooves 2421 are subject to changes in accordance with needs and structural variability, so as to meet the need for adjusting the angle of orientation. This embodiment is exemplified by five positioning grooves 2421 uniformly distributed within a range of 0~60 degrees so that the third case body 25 is adjustable within the range of 0~60 degrees. To maintain a state of equilibrium while rotation adjustment is underway, the two rotating shafts 241 are each penetratingly disposed at each side of said rotary disk 242 in this embodiment, whereas only one of the two rotating shafts 241 is penetratingly disposed at one side of said rotary disk 242 in another embodiment, but the present invention is not limited thereto.

The positioning element 243 comprises a rotating arm 2431, a first resilient component 2432, a press element 2433, and a second resilient component 2434. The rotating arm 2431 is pivotally disposed in the second case body 21. The rotating arm 2431 comprises a first arm body 24311, a second arm body 24312, and a third arm body 24313. The first arm body 24311 and the third arm body 24313 are connected to two ends of the second arm body 24312, respectively. The first arm body 24311 and the third arm body 24313 are parallel. Referring to FIG. 3, the first arm body 24311, the second arm body 24312, and the third arm body 24313 together form an inverted U-shape. The first arm body 24311 and the third arm body 24313 are each pivotally disposed at the second case body 21 about the middles of the first and third arm bodies 24311, 24313, respectively, so that two ends of the first arm body 24311 and two ends of the third arm body 24313 can rotate relatively to each other. In this embodiment, two rotary disks 242 are provided, and, to allow the two rotary disks 242 to be fixed in place by the positioning element 243, a positioning post 2435 is disposed at each of the ends of the first arm body 24311 and the third arm body 24313 of the rotating arm 2431, wherein the ends of the first arm body 24311 and the third arm body 24313 of the rotating arm 2431 face away from the second arm body 24312. The positioning posts 2435 are selectively engaged with any one of the positioning grooves 2421 so that the rotary disks 242 are fixed in place and thus can no longer rotate, thereby fixing the third case body 25 in place in a manner to attain the required angle of orientation.

The two ends of the first resilient component 2432 abut against the second arm body 24312 of the rotating arm 2431 and the second case body 21, respectively. The first resilient component 2432 pushes the rotating arm 2431. In this embodiment, to exert a force on the rotating arm 2431 uniformly, two said first resilient components 2432 are disposed at the two ends of the second arm body 24312 and positioned proximate to the first arm body 24311 and the third arm body 24313, respectively.

The press element 2433 is disposed in the second case body 21 and abuts against the second arm body 24312 of the rotating arm 2431. Referring to FIG. 4, the two ends of the second resilient component 2434 abut against the press element 2433 and the second case body 21, respectively. In this embodiment, a blocking plate protrudes from the bottom of the second case body 21 so that the second resilient component 2434 abuts against the blocking plate and the press element 2433. A guide ramp 24331 is disposed in the press element 2433. The guide ramp 24331 abuts against and guides the second arm body 24312 in moving.

Referring to FIG. 3 through FIG. 5, FIG. 3 and FIG. 4 depict the initial position state of the third case body 25 positioned at a first angle of orientation. FIG. 5 depicts the press position state of the third case body 25 to be adjusted to a second angle of orientation. When positioned at the initial position required for the first angle of orientation, the positioning post 2435 is engaged with one positioning groove 2421 so that the rotary disks 242 are fixed in place and thus can rotate no more. To adjust to the second angle of orientation, the user pushes the press element 2433 toward the inside of the second case body 21; meanwhile, the guide ramp 24331 of the press element 2433 abuts against and guides the second arm body 24312 in moving up. The ends, which face away from the second arm body 24312, of the first arm body 24311 and the third arm body 24313 rotate to thereby move away from the rotary disk 242 so that the positioning post 2435 exits the positioning groove 2421.

After the positioning post 2435 has exited the positioning groove 2421, the user can push the third case body 25 to drive the rotary disk 242 connected with the third case body 25 to rotate and thereby attain the required angle of orientation. Upon attainment of the required angle of orientation, the user can release the press element 2433. After the user has released the press element 2433, the second resilient component 2434 exerts a resilient restoring force on the press element 2433, allowing the third case body 25 to return to the initial position shown in FIG. 4. Since the guide ramp 24331 of the press element 2433 no longer abuts against the second arm body 24312, the second arm body 24312 moves under the resilient restoring force of the first resilient components 2432 to return to the initial position shown in FIG. 3. The ends, which face away from the second arm body 24312, of the first arm body 24311 and the third arm body 24313 rotate and thereby get closer to the rotary disk 242 so that the positioning post 2435 is engaged with the positioning groove 2421 required to attain the second angle of orientation. Given the aforesaid structures, the angle of orientation of a tablet mounted on the mounting assembly 20 is adjustable as needed to not only enhance the convenience of watching the tablet, but also enhance the functionality of the dock 100.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A dock with a detachable mounting assembly, comprising:
    a base comprising a first case body and a first connector, the first case body having a plurality of connection holes, the first connector being disposed at a top surface of the first case body; and
    a mounting assembly detachably mounted on the base, comprising:
        a second case body mounted on the first case body;
        a second connector disposed at a bottom surface of the second case body;
        a plurality of fastening components disposed at the second case body, wherein the second case body is mounted on the first case body in a position bringing the second connector into contact with the first connector when the fastening components are fastened to the connection holes, respectively;
        a rotation adjustment module rotatably disposed at the second case body;
        a third case body disposed on the rotation adjustment module and rotatable together with the rotation adjustment module; and
        a third connector disposed at the third case body and electrically connected to the second connector.

2. The dock of claim 1, wherein the rotation adjustment module comprises:
    a rotating shaft fastened to the second case body;
    a rotary disk having a plurality of positioning grooves fastened to the third case body and penetratedly disposed at the rotating shaft; and
    a positioning element engaged with any one of the positioning grooves.

3. The dock of claim 2, wherein the positioning element comprises a rotating arm pivotally disposed at the second case body, with a positioning post disposed at an end of the rotating arm and selectively engaged with any one of the positioning grooves.

4. The dock of claim 3, wherein the positioning element further comprises a resilient component with two ends abutting against the rotating arm and the second case body, respectively.

5. The dock of claim 4, wherein the positioning element further comprises a press element disposed at the second case body and abutting against the rotating arm.

6. The dock of claim 1, wherein the third case body comprises a holding portion and a main body, the holding portion being disposed at an end of the main body, allowing the third connector to be disposed at the holding portion.

7. The dock of claim 6, wherein the third case body further comprises an engaging element disposed at another end of the main body and opposite the holding portion.

8. A dock with a detachable mounting assembly, comprising:
    a base comprising a first case body and a first connector, the first case body having a plurality of connection holes, the first connector being disposed at the first case body; and
    a mounting assembly detachably mounted on the base, comprising:
        a second case body mounted on the first case body;
        a second connector disposed at the second case body and connected to the first connector;

a plurality of fastening components disposed at the second case body and fastened to the connection holes, respectively;

a rotation adjustment module rotatably disposed at the second case body;

a third case body disposed on the rotation adjustment module and rotatable together with the rotation adjustment module; and a third connector disposed at the third case body and electrically connected to the second connector, wherein the rotation adjustment module comprises:

a rotating shaft fastened to the second case body;

a rotary disk having a plurality of positioning grooves fastened to the third case body and penetratedly disposed at the rotating shaft; and a positioning element engaged with any one of the positioning grooves, wherein the positioning element comprises a rotating arm pivotally disposed at the second case body, with a positioning post disposed at an end of the rotating arm and selectively engaged with any one of the positioning grooves, and wherein the rotating arm comprises a first arm body, a second arm body, and a third arm body so that the first arm body and the third arm body are connected to two ends of the second arm body, respectively, and are parallel.

9. The dock of claim 8, wherein the positioning element further comprises a press element and a resilient component, the press element being disposed at the second case body and abutting against the second arm body of the rotating arm, the resilient component having two ends abutting against the second arm body of the rotating arm and the second case body, respectively.

10. The dock of claim 9, wherein the positioning element further comprises another resilient component with two ends abutting against the press element and the second case body, respectively, and the press element has a guide ramp.

* * * * *